Figure 1:
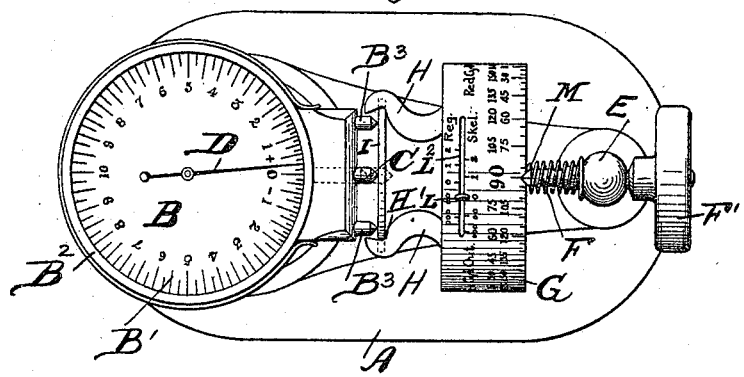

O. MOE.
INSTRUMENT FOR MEASURING AND DETERMINING THE AXES OF LENSES.
APPLICATION FILED AUG. 28, 1908.

965,211.

Patented July 26, 1910.

2 SHEETS—SHEET 1.

Witnesses
Grace E. Wynkoop
Ving E. Mertz

Inventor
Olav Moe
By S. E. Thomas
Attorney

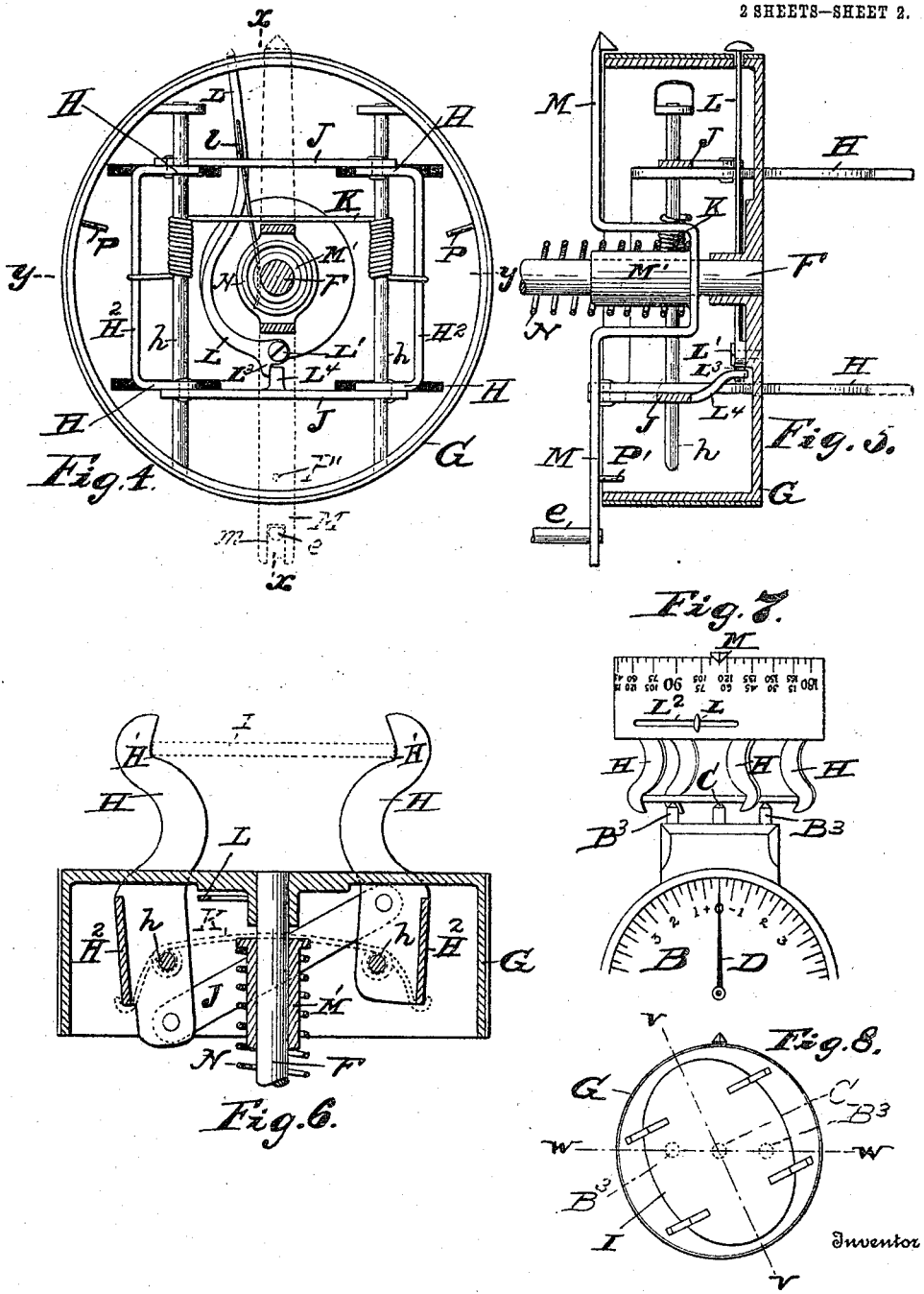

UNITED STATES PATENT OFFICE.

OLAV MOE, OF SIOUX CITY, IOWA, ASSIGNOR TO KENNEDY OPTICAL COMPANY, OF DETROIT, MICHIGAN, A CORPORATION OF MICHIGAN.

INSTRUMENT FOR MEASURING AND DETERMINING THE AXES OF LENSES.

965,211.  Specification of Letters Patent.  Patented July 26, 1910.

Application filed August 28, 1908. Serial No. 450,772.

*To all whom it may concern:*

Be it known that I, OLAV MOE, citizen of the United States, residing at Sioux City, county of Woodbury, State of Iowa, have invented a certain new and useful Improvement in Instruments for Measuring and Determining the Axes of Lenses, and declare the following to be a full, clear, and exact description of the same, such as will enable others skilled in the art to which it pertains to make and use the same, reference being had to the accompanying drawings, which form a part of this specification.

My invention relates to an improvement in instruments for measuring lenses to determine certain facts relative to their size, construction and character, as shown in the accompanying drawings and more particularly pointed out in the following specification and claims.

Instruments have been devised to indicate the refraction of lenses in dioptrics, the usual form consisting of a dial from the frame of which project two fixed pins the points lying in the same plane. Located between these fixed pins is a movable pin forced to the limit of its movement by a spring housed within the dial case. The movable pin is free to travel in or out within certain limits, the construction being such that its movement serves to actuate a revolving pointer designed to traverse the several graduations indicated upon the dial. Upon pressing the face of a lens against the points of the fixed pins, the movable pin is either forced back or is permitted to project beyond the plane of the adjacent pins;—the position of the movable pin being dependent upon the construction of the lens tested. The construction of the parts are such that the movement of the pin serves to actuate the dial pointer thereby indicating the refraction in dioptrics of that side of the lens and whether (+) plus or (−) minus. If the lens is of spherical form, upon rotating it in contact with the pins, the pointer will remain at the graduation originally indicating its curvature, thus denoting a spherical form of lens. If on the contrary the lens tested is a cylinder, upon rotating it in contact with the pins, the dial pointer will turn to (0) zero when the movable pin point is on the same plane with the points of the fixed pins, occurring only when all three are in line with the axis of the cylinder.

It is proposed to use the present invention in conjunction with the device just described and one of its objects is to provide means for readily indicating in degrees the angle of the axis of a cylinder lens with reference to an imaginary line drawn through the long diameter of the usual elliptical form given to the lens.

A further object is to indicate the size or the arbitrary number employed by the trade to designate the particular lens under examination and a still further object is to provide means for mechanically rotating the lens in contact with the fixed and movable pins of the instrument previously referred to.

Other features of the invention will be hereafter described.

Figure 2:
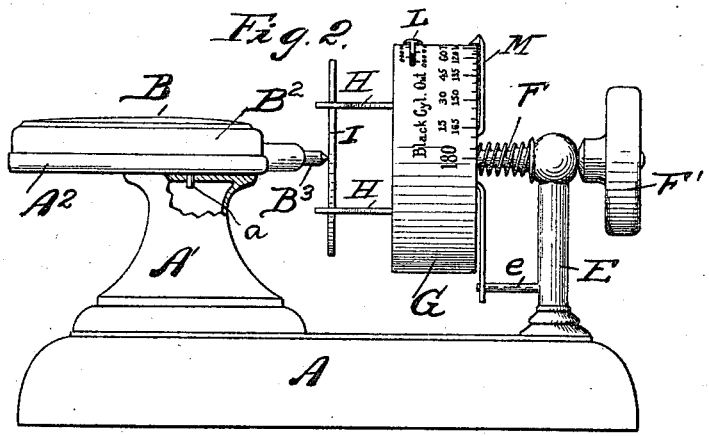
Figure 3:
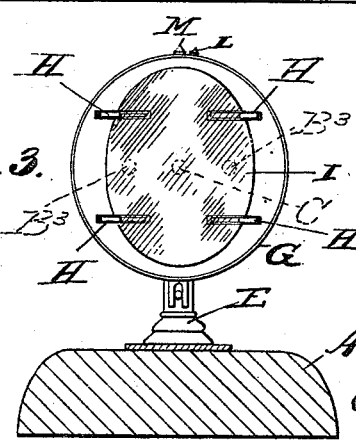

In the drawings:—Figure 1 is a plan view of the instrument. Fig. 2 is a side elevation of the same. Fig. 3 is a cross-sectional view through the frame looking toward the lens and showing it supported by the projecting arms of the graduated drum. Fig. 4 is an enlarged end elevation of the graduated drum, with parts in section, showing details of the mechanism for supporting the lens and for controlling the index fingers or pointers. Fig. 5 is a cross-sectional view through the same on line $x$—$x$ of Fig. 4. Fig. 6 is a cross-sectional view through the drum on line $y$—$y$ of Fig. 4, showing in dotted lines a lens held by the projecting arms of the graduated drum. Figs. 7 and 8 are diagrammatic views indicating the position of the revolving pointer with reference to that of the graduated rotating drum and its fixed pointer when determinating the angle of the axis of a cylinder lens.

Referring now to the letters of reference placed upon the drawings: A is a suitable base from one end of which rises a pedestal A′ on top of which is mounted a tray A² pivoted at $a$ to the pedestal in order to provide for a slight swinging movement, the object of which will be hereafter explained.

B is a phacometer mounted upon the tray A² in which B′ is a graduated dial and B² the frame of its inclosing case.

B³, B³ are immovable pins projecting from the frame of the dial, their points being upon the same plane.

C is a movable pin held to the limit of its movement by a spring (not shown) housed within the case.

D is a revolving pointer designed to traverse the graduated dial actuated by the movement of the pin C by mechanism inclosed within the case.

The details of construction of the instrument just referred to being well known, and as they form no part of this invention, it will be unnecessary to enter into further detailed description in order to explain the operation and purpose of the present invention.

E is a standard or post in line with the pedestal A′ at the opposite end of the base A. Supported by the standard E and free to turn therein is a shaft F in line with the movable pin C. At one end of the shaft F is mounted a cylinder or drum G while the other end is provided with an operating handle or knob F′.

H denotes four jaws pivoted to the rods $h$ supported within and by the wall of the drum. The jaws H project through slots provided in the end wall of the drum and are notched at H′ to provide for gripping the lens I.

J are cross links connecting the jaws H together within the drum to provide for a like movement of each of them, thus insuring the proper centering of the lens when forced between the jaws.

K is a spring coiled around the rods $h$, its projecting ends bearing upon the cross bars H² of the jaws H to cause the latter to automatically grip the lens when forced between them.

L is a pointer pivoted at L′ to the end wall of the drum, its free end projecting through a slot L² in the drum's circular wall. Projecting from the pivoted end of the pointer L is a lug L³, designed to encounter an arm L⁴, secured to one of the links J which connect the lens gripping jaws H.

$l$ is a spring secured at one end to the pointer L, its free end bearing against the shaft F to force the pointer to its initial position, or the limit of its movement in one direction.

A graduated scale is located adjacent to the slotted opening in the circular wall of the drum denoting the size or arbitrary numbers by which the several sizes of stock lenses are known. Upon inserting a lens between the jaws H the swinging pointer L is operated by the action of the arm L⁴ contacting with the lug L³ of the pointer:—the pointer swinging to the graduation denoting the size or number of the lens tested.

M is a vertical pointer sleeved at M′ upon the shaft F, its lower end being slotted at $m$ to straddle a pin $e$ designed to hold the pointer against movement. The pointer M being sleeved upon the shaft F, as just stated, will not move on the shaft F when the drum G is rotated, and as the pointer M remains immovable, it acts in conjunction with the protractor or scale on the drum adjacent to the upper end of the pointer, to indicate the angle of the axis of the lens.

N is a spring coiled around the shaft F and the sleeve of the pointer M, the ends of the spring bearing against the pointer M and the post E. As the pointer M bears against the edge of the drum G and is free to slide along the shaft F, the action of the spring serves to force the drum and shaft in the direction of the phacometer B,—the knob or handle F′ secured to the shaft serving to limit its movement in that direction. Adjacent to the edge of the circular wall of the drum G and in reading relation to the pointer M is a protractor, or scale graduated to degrees.

P denotes inwardly projecting pins in the circular wall of the drum which serve upon contacting with the pin P′, set in the lower end of the pointer M, to limit the rotation of the drum in either direction.

Having indicated the several parts by reference letters the operation of the device will be readily understood.

The lens to be tested is thrust between the jaws H supported in the drum G, the action of the spring N forcing the lens in contact with the pins B³, and C, of the phacometer B;—while the latter being mounted upon a swinging tray A² readily alines itself so that the fixed pins properly contact with the face of the lens. The point of the movable pin being continually in contact with the lens while being held by the jaws, it is forced in or moves out in conformity with the contour or surface of the lens tested. The movement of the pin C serves to actuate the rotating pointer D and causes it to traverse the dial B′ as before explained;—thus indicating the degree of curvature of the lens plus (+) or minus (−) as indicated upon the dial. In the event of its being a cylinder lens, upon rotating it until the pointer D swings farthest from (0) zero the power of the cylinder will be indicated. Now in order to determine the angle of the axis of the cylinder, the lens is rotated until the pointer D swings to (0) zero, this indicates that the three pins B³, B³, and C are in line with the axis of the cylinder. The angle of the axis of the cylinder with respect to an imaginary line (see $v$—$v$ Fig. 8) drawn through the long diameter of the lens may now be readily determined by reading the graduated scale on the circular wall of the drum in conjunction with the fixed vertical pointer M. As previously explained, the spreading apart of the lens supporting jaws H by inserting a lens between them, actuates the pointer L which indicates on its graduated scale the size or arbitrary number of the lens tested. It will also be noted that by gripping the lens at four points in the manner shown the lens is automatically centered.

Having thus described my invention, what I claim is:

1. In an instrument of the class described, a plurality of lens gripping arms linked together, the links, a spring adapted to actuate the arms to grip the lens, a swinging pointer actuated by the movement of the gripping arms, means for returning the pointer to its initial position, and a graduated member employed in conjunction with the swinging pointer to indicate the size or number of the lens tested.

2. In an instrument of the class described, a plurality of lens gripping arms linked together, the links, a swinging pointer actuated by the movement of said gripping arms, a spring for returning the pointer to its initial position, and a graduated drum employed in conjunction with the swinging pointer to indicate the size or number of the lens being tested.

In testimony whereof, I sign this specification in the presence of two witnesses.

OLAV MOE.

Witnesses:
 I. E. DE LEE,
 CHAS. W. ADAMS.